United States Patent [19]

Farish et al.

[11] 4,085,386
[45] Apr. 18, 1978

[54] INDEPENDENT INITIATION TECHNIQUE OF GLOW DISCHARGE PRODUCTION IN HIGH-PRESSURE GAS LASER CAVITIES

[75] Inventors: Owen Farish, Bearsden, Glasgow, Scotland; Richard L. Hundstad, Wilkinsburg, Pa.

[73] Assignee: Westinghouse Electric Corporation, Pittsburgh, Pa.

[21] Appl. No.: 665,349

[22] Filed: Mar. 9, 1976

Related U.S. Application Data

[63] Continuation of Ser. No. 365,390, May 30, 1973, abandoned.

[51] Int. Cl.² .......................................... H01S 3/097
[52] U.S. Cl. .............................. 331/94.5 PE; 313/198
[58] Field of Search ................. 331/94.5 PE, 94.5 D; 313/197, 198

[56] References Cited

U.S. PATENT DOCUMENTS

| | | | |
|---|---|---|---|
| 3,702,973 | 11/1972 | Daugherty et al. | 331/94.5 PE |
| 3,721,915 | 3/1973 | Reilly | 331/94.5 PE |
| 3,886,479 | 5/1975 | Pearson | 331/94.5 |

OTHER PUBLICATIONS

Dumanchin, R. et al, Compt. Rend. Acad. Sc. Paris, Series B, vol. 269, Nov. 3, 1971, pp. 916–917.
Denes, et al, Electronics Letters, vol. 7, No. 12, June 17, 1971, pp. 337–338.
Heller, B. et al, Electrical & Electronics Abstracts, vol. 70, No. 837, Sept. 1967, p. 1099.

*Primary Examiner*—William L. Sikes
*Assistant Examiner*—Marcus S. Rasco
*Attorney, Agent, or Firm*—M. P. Lynch

[57] ABSTRACT

A trigger circuit which operates independently of the main discharge circuit can be used to initiate glow discharge useful for gas laser excitation. By utilizing independent trigger means, such as auxiliary dielectric electrodes, the main discharge can be controlled by modulating only a small part of the total energy input to the laser cavity. The main discharge gap of the laser is prestressed to a voltage below the spark breakdown voltage threshold of the electrode assembly under static conditions but above the glow discharge voltage of the electrode assembly. When the trigger means is pulsed to supply free electrons to the discharge gap the glow discharge is initiated between the electrodes independent of the need for modulating the main power to the gap.

2 Claims, 4 Drawing Figures

INDEPENDENT INITIATION TECHNIQUE OF GLOW DISCHARGE PRODUCTION IN HIGH-PRESSURE GAS LASER CAVITIES

This is a continuation of application Ser. No. 365,390 filed May 30, 1973, now abandoned.

BACKGROUND OF THE INVENTION

1. Field of the Invention:

This invention relates to high power gas lasers. It is specifically concerned with a pulsed laser operating at high pressure under static gas conditions or with gas flow through the laser cavity while modulating the glow discharge by independent pulsing means.

2. Description of the Prior Art:

Laser systems have been developed using a double discharge to supply initiatory free electrons to the main discharge gap by means of a first discharge and then subsequently pulsing the gap to develop a high energy main glow discharge. The advantages of this type of operation include stabilization of the glow discharge without arcing and providing for discharge paths such that any arcing during the preliminary discharge is outside the useful volume of the laser cavity. The double discharge form of excitation has also made possible excitation of larger volumes of gas.

In a double discharge system various electrode geometries are possible. The preliminary discharge can be across a separate pair of electrodes, producing free electrons in the gap between another pair of electrodes between which the main discharge then takes place. Or a three electrode geometry is possible in which one electrode is common to both discharges.

However the common feature of a double discharge excitation system regardless of the particular electrode geometry is the interaction or dependency between the two discharges. The initial or preliminary discharge which takes place is not independent of the main discharge. The interdependence of the two discharges requires the switching or modulating of the total power into the discharge gap. Thus the main discharge gap is pulsed which requires the switching of kilovolt potentials in submicrosecond time periods. Such modulation of power in the discharge gap requires expensive pulsing equipment including a power supply and switching means such as a thyratron.

DETAILED DESCRIPTION OF THE INVENTION

Figure 1A:
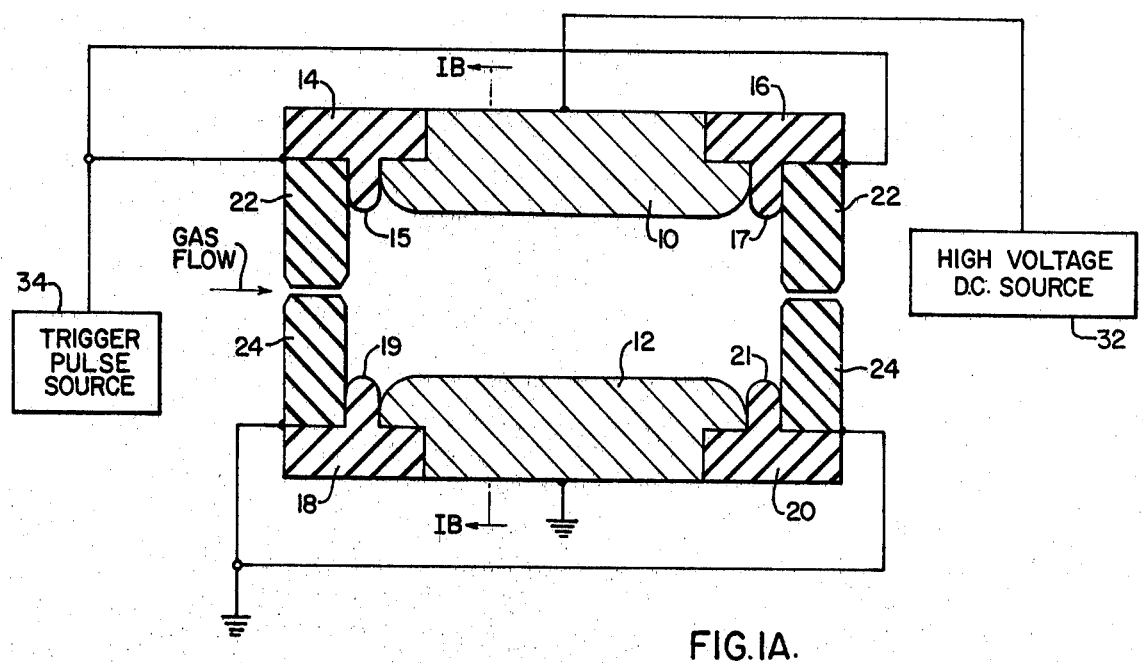
FIG. 1A is a cross section view of one embodiment of the present invention.
Figure 1B:
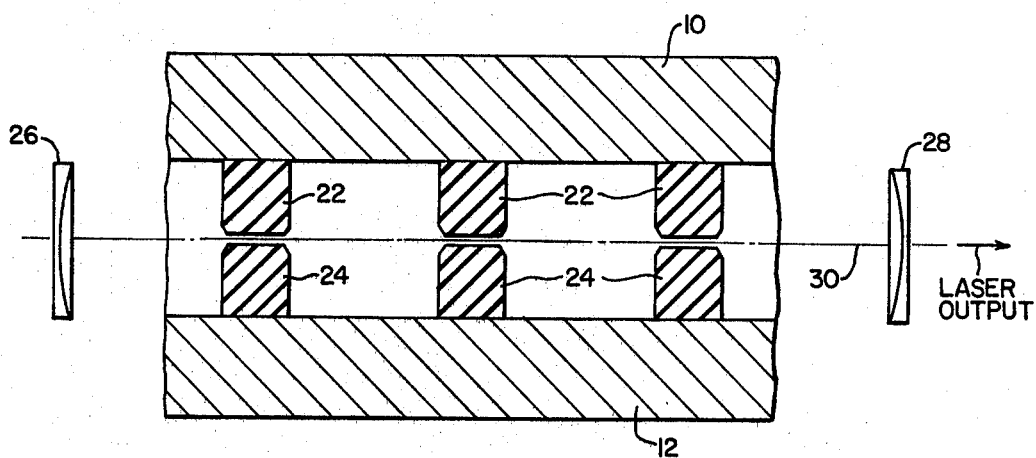
FIG. 1B is a partial section of the embodiment shown in FIG. 1A taken along line 1B.

In FIGS. 1A and 1B, an optical cavity of a laser device which incorporates the present invention is shown. Main electrodes 10 and 12 are positioned having surface portions parallel and opposite one another defining the main discharge gap therebetween. Main electrodes 10 and 12 can be profiled as shown to prevent distortion of the electric field at the edges. Dielectric members, in this instance a series of pairs of dielectric buttons 22 and 24, made for instance of titanium dioxide (rutile), are placed adjacent and along both sides of the discharge region defined between electrodes 10 and 12. Each one of the pairs of dielectric buttons 22 and 24 define a narrow gap region therebetween which in the limiting case touch one another. The buttons act as the triggering means for a glow discharge across the main gap region of the assembly.

Main electrode 10 is fixedly attached to insulating members 14 and 16. Dielectric buttons 22 are supported by insulating members 14 and 16 being partially shielded from electrode 10 by projections 15 and 17 of insulating members 14 and 16 respectively. Insulating members 18 and 20 similarly support main electrode 12 in a fixed position and support the dielectric buttons 24. The dielectric buttons 24 are partially shielded from main electrode 12 by projections 19 and 21.

The total assembly envelops the discharge region defined by main electrodes 10 and 12 and as shown in FIG. 1B, the reflecting elements 26 and 28 define an optically resonant cavity which is essentially coextensive with that discharge region. The optical axis 30 of the cavity is parallel to the surface portions of the main electrodes 10 and 12.

Gas flow is transverse to the direction of discharge between electrodes 10 and 12 and also transverse to the optical axis 30 of the laser device. Means for causing gas flow are not shown but would typically include pumping means, heat exchange means and the necessary duct work for directing the flow of gas between the electrodes 10 and 12.

The electrode 12 is grounded while the second electrode 10 is connected to the high voltage DC source 32, the specific voltage applied being dependent on gap spacing and gas characteristics. The potential across the main discharge gap is maintained at a voltage exceeding the glow voltage threshold but below the static spark breakdown voltage threshold of the electrode assembly. Under static conditions and with no discharge across the gap, continuous electrodes having planar surfaces will support a voltage above the glow voltage and below the spark breakdown voltage of the assembly. It is to be noted that as the electrodes depart from a strictly continuous, planar surfaced configuration that the glow voltage approaches and may exceed the value of the spark breakdown voltage under static conditions. This affect is due partly to the field enhancement phenomenon resulting from discontinuities in the electrodes such as edges and points which result in excessive charge accumulation in selected regions. Under those conditions the discharge gap cannot be prestressed without arc breakdown occurring.

The dielectric buttons 22 are connected to a trigger pulse source 34 and the dielectric buttons 24 are effectively grounded. Application of an independent trigger pulse from source 34 to the buttons 22 and 24 causes corona discharges in the gap regions between each pair of buttons. Free electrons from corona discharges injected into the discharge region while the main electrodes 10 and 12 are under stress condition will initiate a glow discharge. The trigger pulse which is applied to the pairs of dielectric buttons 22 and 24 represent a very small portion of the total power into the device. The power expended between the dielectric button pairs might for instance be on the order of 2 or 3%. The independently applied trigger pulses in essence control the main discharge between electrodes 10 and 12. The main discharge can thereby be modulated or switched by pulsing only the dielectric button pairs 22 and 24.

The advantage of being able to independently pulse the dielectric members is quite significant. Much higher voltages can be applied to the dielectric members 22 and 24 without risking spark breakdown in the main gap region. The higher voltages applied to the members give a more intense pre-discharge and consequently a higher current density glow discharge across the main gap region.

In operation the device of FIGS. 1A and 1B facilitates high power switching and increased glow duration. Since it is independent of the voltage applied to the main electrodes, the rise time for the voltage pulse on the button pairs 22 and 24 or other appropriate trigger devices can be different from that applied to the main electrodes. For example a fast, high voltage spike pulse could be applied to the buttons while a slower DC pulse could be applied to the electrodes 10 and 12. Since most of the energy to the gap is applied by the high voltage DC voltage source 32, this operation greatly reduces the requirements for high power switching.

In operation the device of FIG. 1A and 1B could be used with a pulsed DC voltage applied to the electrode assembly from the high voltage DC source 32. The rise time and duration of the pulsed voltage would not be critical in that the glow discharge between electrodes 10 and 12 would primarily be controlled by the trigger pulse applied from the source 34 to the dielectric buttons 22 and 24. Providing that the combination of initial electron current and mid-gap field distortion can cause a reduction in the static breakdown voltage of the main gap, then a direct continuous DC voltage applied to the electrodes 10 and 12 is possible with full switching accomplished by pulsing the buttons 22 and 24 only.

In FIG. 1B it is shown that the opitcal axis 30 passes through the discharge region between electrodes 10 and 12. A resonant optical cavity is defined by the reflective optical elements 26 and 28 which are situated at either end of the electrode assembly. Additionally gas flow is provided transverse to the direction of discharge between electrodes 10 and 12 passing between the pairs of dielectric buttons 22 and 24.

Figure 2:
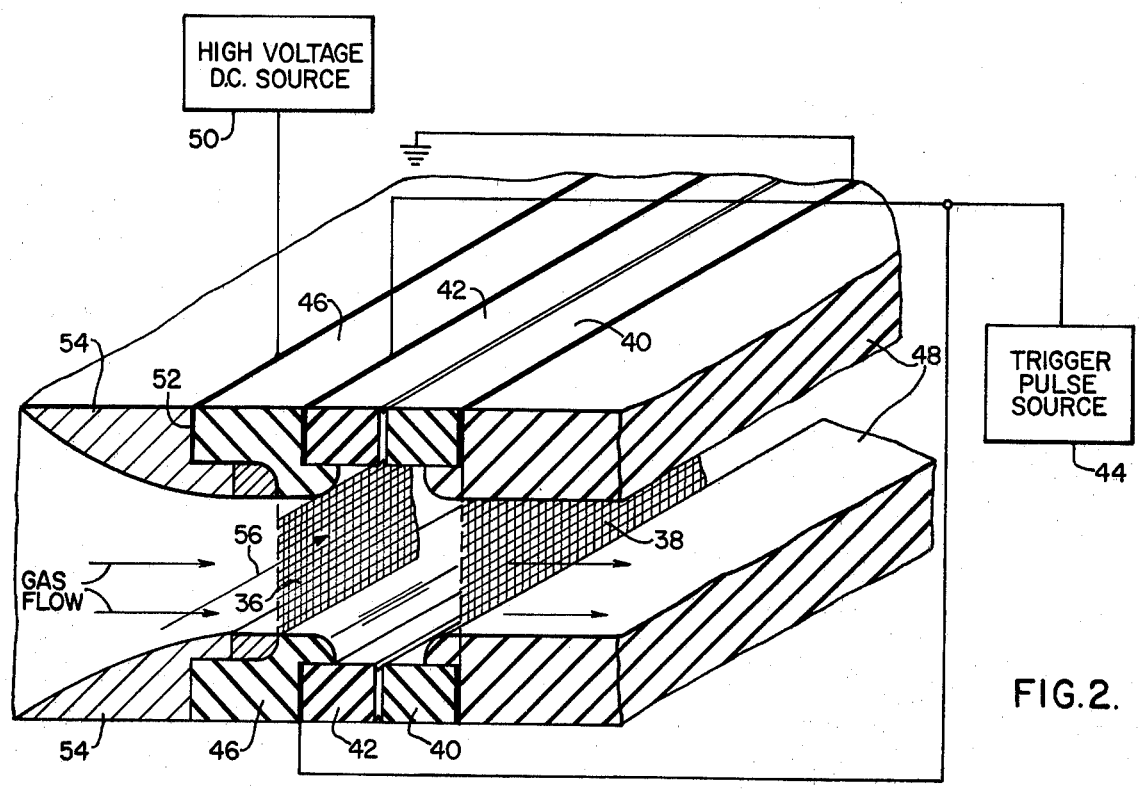
FIG. 2 is another embodiment having gas flow through the electrodes.

In FIG. 2 an alternative embodiment is shown in an electrode assembly comprised of the mesh electrodes 36 and 38. The screen electrodes 36 and 38 are constructed to be pervious to gas flow while minimizing discontinuities on the surface of the electrodes so as to present a smooth surface to the discharge therebetween. A pair of electrodes in the form of elongated continuous members 40 and 42 are positioned adjacent the main discharge region and have contiguous surfaces which can either touch or be narrowly separated to define a narrow gap therebetween. These slab-like electrodes 40 and 42 are made of a material having a high dielectric constant such as rutile.

A corona discharge can be initiated along the length of the electrodes 40 and 42 by application of a trigger pulse from trigger pulse source 44. Since electrodes 40 and 42 need not carry high energy the dielectric material is particularly appropriate for providing the corona discharge to initiate the main glow discharge. If the energy densities were high, damage to the dielectric material of the electrode system would be likely.

The two slab dielectric electrodes 42 are insulated from the main electrode 36 by insulating members 46. The two dielectric electrodes 40 and the main electrode 38 are fixedly attached to the insulating members 48. Both the main electrodes 38 and the two dielectric slab electrodes 40 are held at some reference potential such as ground. The main electrode 36 is connected to high voltage DC source 50 by means of a conductive element 52 which for instance can be a conductive lamination of wire between the insulating member 46 and the duct work member 54.

The gas flow is through appropriate duct work which includes an inlet defined by the duct work members 54. Not shown in FIG. 2 is the appropriate pumping and heat exchange apparatus to provide for constant gas flow through the discharge region between main electrodes 36 and 38.

In the embodiment of FIG. 2 the gas flow is parallel to the discharge between the electrodes 36 and 38. The discharge is initiated by applying a trigger pulse from source 44 to the dielectric slab electrodes 42 and 40 so as to generate a corona discharge therebetween. The corona discharge contributes free electrons to the discharge region and irradiates with ultraviolet radiation the electrode 36 to produce additional electrons by photoemission or photoionization of the gas. When the main electrode gap is stressed by either a constant DC voltage or a pulsed DC from source 50 at some level above the glow voltage and below the spark breakdown voltage of the particular electrode assembly geometry, a transient glow discharge can be maintained by continued supply of electrons by the independent trigger means.

Figure 3:
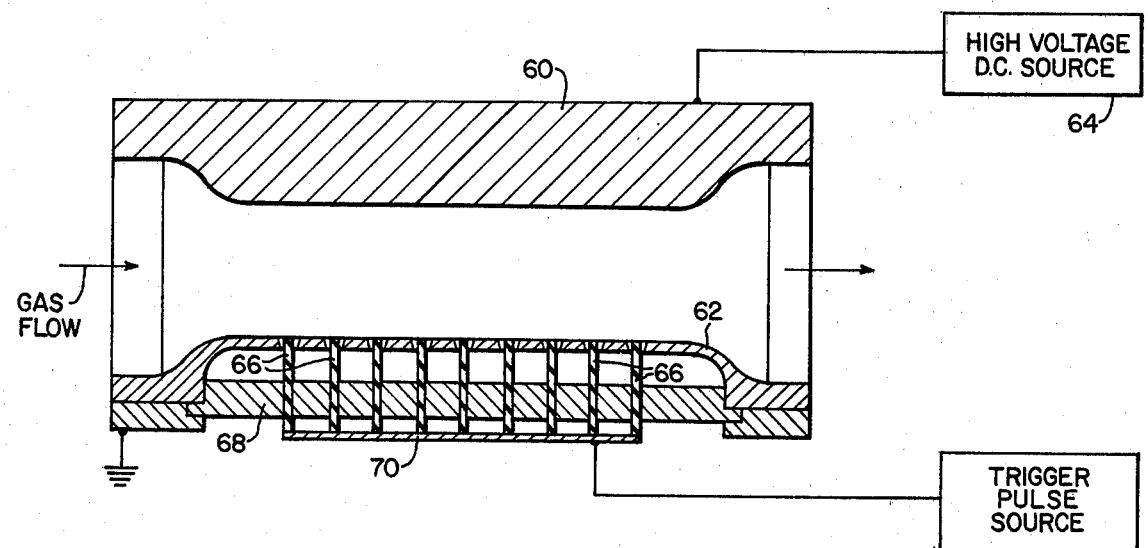
FIG. 3 is another embodiment of the present invention utilizing rutile strips emplanted in one electrode.

FIG. 3 shows an additional embodiment modified by providing a segmented cathode which includes dielectric inserts (e. g. titanium dioxide) which can be independently pulsed to trigger the main discharge. In FIG. 3 continuous surface electrodes 60 and 62 are contoured at their edges to minimize field distortion and are set opposed one to another in a uniform field configuration. The region between the surfaces of the electrodes 60 and 62 is the main glow discharge region for excitation of the laser gas. The gas flow is transverse to the direction of discharge. main electrode 60 is connected to the high voltage DC source 64.

The electrode 62 is segmented with strips of dielectric material interposed between sections of the electrode itself. The strips of dielectric material 66, which for instance can be rutile, run the length of the electrode 62 having surface portions coplanar with electrode 62 and are supported by a support member 68 which is positioned below the electrode 62. The rutile strips are bussed together below the support members 68 by a metal plate 70 which in turn is connected to the trigger pulse source 72.

Conceptually the embodiment shown in FIG. 3 operates in a manner similar to that of the device as shown in FIGS. 1 and 2. The electrodes 60 and 62 are stressed by application of a potential from the high voltage DC source 64 which is below spark breakdown but above the glow discharge voltage required for the particular electrode geometry. The glow discharge itself is triggered by applying a short and sharp pulse potential to the dielectric strips 66 causing corona discharge adjacent the electrode 62, this electrode being held at a reference potential such as ground level. The corona discharge being relatively uniform across the continuous surface of electrodes 62 produces free electrons adjacent the surface of electrode 62 and initiates the glow discharge in the main discharge region. The glow discharge in turn acts to excite the laser gas to upper laser energy levels. With the proper optics as in FIG. 1B attached to the electrode assembly of FIG. 3 a resonant cavity producing an output laser beam can be constructed.

As in the other embodiments shown, in the device of FIG. 3 gas flow would be maintained by a system which would include pumping and heat exchange means. This part of the system is not shown but is well known and easily adapted to operate with the electrode assembly shown.

We claim:

1. A gas laser apparatus comprising:
   a resonant optical cavity including optical reflective elements terminating each end of said cavity,
   a gas medium at a pressure suitable for lasing action within said resonant optical cavity,
   a main electrode assembly means including first and second spaced apart electrode means having surface portions extending in a substantially parallel, opposing relationship, the discharge region of said laser apparatus corresponding to the region between the opposing surface portions of said first and second electrode means, said resonant optical cavity being defined by said optical reflective elements and being essentially coextensive with said discharge region, said first and second spaced apart electrode means being elongated continuous electrodes,
   an auxiliary electrode assembly means including dielectric electrode means consisting of a plurality of discrete pairs of oppositely disposed dielectric electrodes extending between said first and second electrode means and combining with said first and second electrode means to envelope said discharge region,
   electrical excitation means connected to said auxiliary electrode assembly means to initiate corona discharge resulting in the injection of free electrons by said auxiliary electrode assembly means into said discharge region, and
   D.C. voltage means connected to said main electrode assembly means to produce a glow discharge in said discharge region in response to said free electrons.

2. A laser apparatus as claimed in claim 1 wherein said excitation means connected to said auxiliary electrode means is a pulsed electrical excitation means which is operatively independent of said D.C. voltage means.

* * * * *